UNITED STATES PATENT OFFICE.

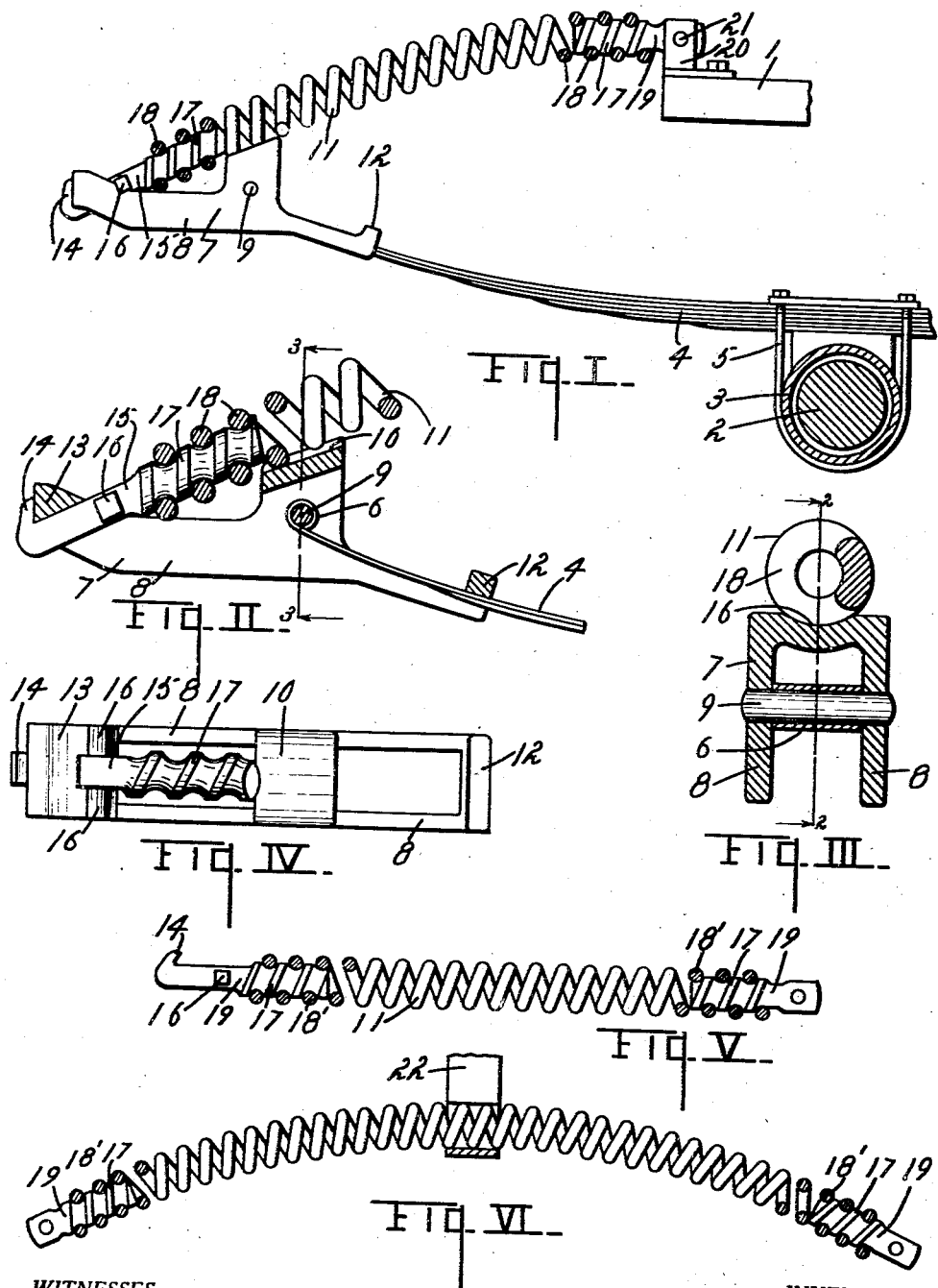

ALVAN B. BROWN, OF GRAND RAPIDS, MICHIGAN.

VEHICLE-SPRING.

1,245,564.  Specification of Letters Patent.  Patented Nov. 6, 1917.

Application filed June 23, 1917. Serial No. 176,564.

*To all whom it may concern:*

Be it known that I, ALVAN B. BROWN, a citizen of the United States, residing at Grand Rapids, county of Kent, State of Michigan, have invented certain new and useful Improvements in Vehicle-Springs, of which the following is a specification.

This invention relates to improvements in vehicle springs. My invention is particularly designed by me for use on motor vehicles but it is also adapted to other types of vehicles having a platform or body supported on the running gear by means of springs.

The main objects of this invention are:

First, to provide an improved spring which is very resilient and at the same time does not have an objectionable rebound or reaction.

Second, to provide an improved spring for motor vehicles which largely eliminates the minor vibrations as well as heavy shocks and jars from the vehicle body.

Third, to provide an improved spring structure which is very resilient and at the same time one which is not likely to be broken in use.

Fourth, to provide an improved spring structure which is economical to manufacture.

Further objects, and objects relating to details and economies of construction and operation will definitely appear from the detailed description to follow.

I accomplish the objects of my invention by the devices and means described in the following specification. The invention is clearly defined and pointed out in the claims.

A structure constituting a preferred embodiment of my invention is illustrated in the accompanying drawing forming a part of this specification, in which:

Figure I is a detail side elevation, partially in section, of a structure embodying the features of my invention, an axle and its housing and a portion of a vehicle body being conventionally shown.

Fig. II is a detail view mainly in longitudinal section on the line 2—2 of Fig. III, showing structural features of the embodiment of my invention shown in Fig. I.

Fig. III is a transverse section on a line corresponding to line 3—3 of Fig. II.

Fig. IV is a plan view of the coupling for the outer ends of the leaf and coil springs.

Fig. V is a side view of the coil spring member and its coupling members, the spring being shown partially in longitudinal section.

Fig. VI is a side view of a modified form of my invention.

In the drawings similar reference characters refer to similar parts throughout the several views and the sectional views are taken looking in the direction of the little arrows at the ends of the section lines.

Referring to the drawings, 1 represents the body of a motor vehicle, 2 the rear axle and 3 the axle housing. These parts are shown conventionally. In the embodiment shown in Fig. I, I provide a semi-elliptic leaf spring member 4 secured to the axle housing by the clip 5. The leaf spring member 4 is provided with the usual shackle eye 6. On the leaf spring member is a coupling member designated generally by the numeral 7 comprising a pair of spaced longitudinal members 8 disposed to embrace the end of the spring member 4 and secured thereto by the coupling pin 9. Above the eye 6 the coupling member 7 is provided with a seat 10 for the coiled spring 11.

The coupling member has a cross piece 12 at its inner end resting upon the leaf spring member 4 and a cross piece 13 at its outer end with which the hook 14 of the coiled spring coupling member 15 is engaged. The coupling member 15 has a cross piece 16 resting upon the coupling member 7. The coupling member 15 is provided with a spiral rib or thread 17 having threaded engagement with the outer end coils 18 of the spring 11 so that the spring 11 is supported to rest on the seat 10 above the eye or end of the spring member 4. At its inner end, the coil spring 11 is provided with a coupling member 19 having spiral ribs 17 in threaded engagement with the inner end coils 18' of the spring 11. This coupling member 19 is secured to the bracket 20 on the body by means of the pin 21.

With the parts thus arranged, the coiled spring 11 constitutes a quarter elliptic element of a three quarters elliptic spring structure and is supported so that the stresses tend to flex it transversely and when arranged as shown in Fig. I, also to compress its coils somewhat. The coiled spring in effect provides a very long flexible spring and I find that it carries the vehicle body so that the smaller road vibrations are effectively eliminated and the heavy shocks are minimized.

The connections in the embodiment shown in Fig. I are such that the coil spring may be substituted for the quarter elliptic spring now commonly used in many motor vehicles, having threequarter elliptic springs and it is found that it adds greatly to the resiliency of such springs and obviates the necessity for shock absorbers and other appliances designed to prevent or minimize rebounds and the like.

In the modification shown in Fig. VI, the coil spring is adapted as a semi-elliptic as distinguished from a quarter elliptic, as shown in Fig. 1. In this embodiment the center of the spring is held by a clip 22, while each end is provided with a coupling member 19.

I have not attempted to describe various other embodiments or adaptions of my invention which I contemplate as I believe the disclosures made will enable those skilled in the art to which my invention relates, to embody or adapt the same as may be required.

Having thus described my invention, what I claim as new and desire to secure by Letters Patent, is:

1. In a structure of the class described comprising an axle and a body member, the combination of a leaf spring member secured to said axle and having an eye, a coupling member secured to said leaf spring member by a pin disposed through said eye and provided with a rest above said eye and an arm resting on said leaf spring member and a second arm projecting beyond said leaf spring member, a coiled spring member, and inner and outer spirally ribbed coupling members having threaded engagement with the end coils of said coiled spring, the outer coupling member having a hook engaged with the outer arm of said coupling member on said leaf spring and a cross piece resting thereon disposed so that said coiled spring rests on said rest, the other coupling member of said coiled spring being secured to said body.

2. In a structure of the class described comprising an axle and a body member, the combination of a leaf spring member secured to said axle and having an eye, a coupling member secured to said leaf spring member by a pin disposed through said eye and provided with a rest above said eye and an arm resting on said leaf spring member and a second arm projecting beyond said leaf spring member, a coiled spring member, and inner and outer spirally ribbed coupling members having threaded engagement with the end coils of said coiled spring, the outer coupling member being engaged with the outer arm of said coupling member on said leaf spring so that said coiled spring rests on said rest, the other coupling member of said coiled spring being secured to said body.

3. In a structure of the class described, the combination of a leaf spring member having an eye, a coupling member secured to said leaf spring member by a pin disposed through said eye and provided with a rest above said eye and an arm resting on said leaf spring member and a second arm projecting beyond said leaf spring member, a coiled spring member, and a spirally ribbed coupling member having threaded engagement with the coils of said coiled spring and having a hook engaged with the outer arm of said coupling member on said leaf spring and a cross piece resting thereon disposed so that said coiled spring rests on said rest.

4. In a structure of the class described, the combination of a leaf spring member having an eye, a coupling member secured to said leaf spring member by a pin disposed through said eye and provided with a rest above said eye and an arm resting on said leaf spring member and a second arm projecting beyond said leaf spring member, a coiled spring member, and a spirally ribbed coupling member having threaded engagement with the coils of said coiled spring, and engaged with the outer arm of said coupling member on said leaf spring so that said coiled spring rests on said rest.

5. In a structure of the class described the combination of a leaf spring member having an eye, a coupling member secured to said leaf spring member by a pin disposed through said eye and provided with a rest above said eye and an arm resting on said leaf spring member and a second arm projecting beyond said leaf spring member, a coiled spring member, and a coupling member engaged with said coiled spring and with the outer arm of said coupling member on said leaf spring so that said coiled spring rests on said rest.

6. In a structure of the class described, the combination of a leaf spring member having an eye, a coiled spring, a coupling member comprising spaced longitudinal members embracing the end of said leaf spring member and secured thereto by a bolt disposed through its said eye, said coupling member having a seat above said eye and inner and outer cross pieces, the inner cross piece resting on said leaf spring, and spirally ribbed coupling members having threaded engagement with the end coils of said coiled spring, one of said members having a hook at its outer end engaged with the outer cross piece of said coupling member mounted on said leaf spring member and a cross piece resting on the side members thereof so that said coiled spring is supported upon said seat.

7. In a structure of the class described, the combination of a vehicle comprising a running gear and a body, of a coiled spring having one end rigidly secured to said running gear and the other end secured to said body at a point laterally removed from the point of attachment to the running gear whereby said coiled spring is caused to flex transversely.

8. In a structure of the class described, the combination of a coiled spring, coupling members having rigid engagement with the end coils of said spring, and means for securing one of said coupling members to the body and the other to a running gear of a vehicle, said spring being disposed so that the load carried thereby tends to flex it transversely.

9. In a structure of the class described, the combination of a coiled spring, coupling members having spiral ribs with which the end coils of said spring have threaded engagement, and means for securing one of said coupling members to the body and the other to a running gear of a vehicle, said spring being disposed so that the load carried thereby tends to flex it transversely.

10. In a structure of the class described, the combination of a leaf spring, a coupling mounted on one end thereof, and a coiled spring having one end secured to said leaf spring coupling and provided with a coupling at its other end disposed so that the load upon said coiled spring tends to flex it transversely.

11. A structure of the class described, comprising a coiled spring and coupling connections for the ends of said spring, said spring being disposed and supported by said coupling connections so that the load carried thereby tends to flex it transversely.

12. In a structure of the class described, the combination with a leaf spring of a coiled spring connected at one end to said leaf spring and disposed to constitute an elliptical spring element.

In witness whereof, I have hereunto set my hand and seal in the presence of two witnesses.

ALVAN B. BROWN. [L. S.]

Witnesses:
CHARLES H. FIELD,
WILLIAM P. DREYER.